(12) United States Patent
Oks et al.

(10) Patent No.: US 8,248,482 B2
(45) Date of Patent: Aug. 21, 2012

(54) DIGITAL CAMERA PERSONALIZATION

(75) Inventors: Eduard Oks, Bat-Yam (IL); Noam Sorek, Zikhron-Yaakov (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 457 days.

(21) Appl. No.: 12/121,264

(22) Filed: May 15, 2008

(65) Prior Publication Data

US 2009/0284621 A1 Nov. 19, 2009

(51) Int. Cl.
*H04N 5/228* (2006.01)
*G06K 9/62* (2006.01)
*G03B 17/00* (2006.01)

(52) U.S. Cl. .................. 348/222.1; 382/155; 396/49

(58) Field of Classification Search ............... 348/222.1, 348/211.6; 382/155; 396/49
See application file for complete search history.

(56) References Cited

U.S. PATENT DOCUMENTS

| 5,227,835 | A  | * | 7/1993 | Anagnostopoulos | ........... 396/49 |
| 7,714,898 | B2 | * | 5/2010 | Pilu | .............................. 348/222.1 |
| 2008/0174678 | A1 | * | 7/2008 | Solomon | ................... 348/231.99 |

OTHER PUBLICATIONS

J. Nakamura, "Image Sensors and Signal Processing for Digital Still Cameras".
Duda, Hart, and Stork, "Pattern Classification", Wiley Interscience, ISBN: 0471056693, Edition 2nd, 680 Pages.

* cited by examiner

*Primary Examiner* — Chieh M Fan
*Assistant Examiner* — Dillon Durnford Geszvain
(74) *Attorney, Agent, or Firm* — Roach Brown McCarthy & Gruber, P.C.; Kevin D. McCarthy

(57) ABSTRACT

A method for optimizing a digital image acquired by a camera, according to the preference of the user of the camera, comprises determining the user's preferences based on user behavior in respect of one or more previously acquired images and thereafter changing one or more shooting parameter of the camera based on said behavior.

9 Claims, 3 Drawing Sheets

(a)              (b)

(a)              (b)

DIGITAL CAMERA PERSONALIZATION

FIELD OF THE INVENTION

The present invention relates to the field of digital image capturing. More particularly, the invention relates to a method for improving the quality of captured digital images, and to digital cameras implementing the method.

BACKGROUND OF THE INVENTION

Capturing photos has become very popular in last few decades, particularly in view of the many capabilities made available to the user of digital cameras, such as the immediate and direct viewing of captured images, the ease by which said images are stored and sent over networks, such as cellular networks or the Internet, to be shared with friends and social communities. Such uses have become even more widespread since cameras have begun to be incorporated in cellular phones and other mobile communication devices. The cameras provided in the phones allow and even wider use by permitting to send MMS to other users and to think the captured images directly using Bluetooth-enabled printing devices.

Unfortunately captured pictures cannot always be crisp and bright, and sharp and focused at the same time. There are many physical restrictions to capturing quality photos, such as the amount of light available during the capture processing. Lack of lighting during the capturing causes the photos to suffer on one side from noise and darkness, and on the other side from blur and de-focus. This situation is very common when, for instance, users which to take pictures of outdoor scenery in the evening, or in indoor places with low illumination (like cafés, bars and theaters). Shooting parameters can in principle be adjusted to optimize the quality of the captured picture. There are two main parameters that allow such adjustment: exposure time and gain (digital/analog). However, increasing the gain will increase the noise level of the captured picture.

To complicate the situation, each individual camera user has his own preferences, which may differ from those of another user. For instance, one user likes sharp images with high noise, while in other will prefer low noise levels on blurred photo. Most modern cameras allow the user adjust shooting parameters before taking a picture, but this option is seldom exploited, and in fact is most users are not familiar with it and leave their cameras in the automatic mode, which has been preset in the factory and is the same for all users.

Modern cameras have many internal algorithms that define the camera capture processing. The user can choose between different capturing modes, and each mode has an automatic behavior which has been preset at the factory, but often the user can manually configure the behavior of these algorithms. However, manual configuration requires special professional knowledge (such as a deep understanding of the camera capture parameters and their results, such as Exposure time, Gain, Aperture, Focus, as well as a deep understanding of camera post processing: Digital Noise Reduction(DNR), Contrast enhancement, Edge enhancement, Gamma correction).

The art has so far failed to provide a user-friendly solution to this problem. There is therefore a need to provide digital imaging apparatus that overcomes the aforesaid disadvantages of existing cameras.

It is an object of the present invention to provide a method and apparatus which overcomes the above limitations of the prior art.

It is a further object of the invention to provide a method and cameras using said method, which will allow the user to shoot pictures, within the range of possibilities of shooting parameters, which will more closely approach its preference for the resulting image.

SUMMARY OF THE INVENTION

The invention is directed to a method for optimizing a digital image acquired by a camera according to the preference of the user of the camera, comprising determining the user's preferences based on user behavior in respect of one or more previously acquired images and thereafter changing one or more shooting parameter of the camera based on said behavior.

According to a preferred embodiment of the invention said one or more shooting parameter is a selected from flash on/off, image size, timer, special effects, capture mode and multi-shot.

In another preferred embodiment of the invention the user behavior is employed to analyze a user preference in respect of one or more image property. Preferably, said one or more image property is selected from image histogram, aperture, focus, exposure time, AGC Analog Gain Controller and digital gain, gamma table, RGB offsets, capture composition [(according to pattern detection algorithms) GPS location (to learn if the user has different preferences at different geographic locations), and post-processing information from the image.

The invention also encompasses digital imaging apparatus comprising means for determining the user's preferences based on user behavior in respect of one or more previously acquired images, and for changing thereafter one or more shooting parameter of the camera based on said behavior. Many different digital apparatus can be used in conjunction with the invention. Illustrative and non-limitative examples of such apparatus include digital cameras, particularly a digital camera of a cellular phone or other mobile communication device.

Figure 1:
FIG. 1 shows pictures captured with high gain and having a high noise level, while remaining sharp.
Figure 1:

DETAILED DESCRIPTION OF PREFERRED EMBODIMENTS the invention will be described below with reference to "Digital cameras" in general, since it is applicable to each and every kind of digital camera. However, it should be understood that the invention is particularly useful when the digital camera is incorporated in a cellular phone or other mobile communication device. This is because, while a digital camera owned by a household can sometimes be used by different users, digital cameras incorporated in cellular phones are usually very personal devices, which are always used by the same user.

In the context of the present application the terms "digital image", "picture", "photograph" and related terms are used interchangeably.

Turning now to the shooting process, each captured photo has its unique qualities, such as: noise level, sharpness, focusing, blurring, brightness and contrast. All these qualities can be controlled by the adjustment of capture processing parameters; for example, the noise level is proportional to the camera digital and analog gain parameters, and blurring is almost always proportional to the exposure time. According to the invention, as a first step for each captured image additional data is stored, such as its histogram (which can be calculated after shooting from the image), AE parameters (Exposure time, AGC, Digital gain, gamma), Zoom, Focus quality, Image Jpeg quality, Sharpness Quality (based on edges gradient strength calculation) etc.

According to the invention, the camera learns from the user's behavior after shooting, which photos he likes and which photos he does not like. The user's perception of the image can be determined in a plurality of ways, based on user's behavior, and the invention is not meant to be limited to any specific behavioral analysis. Illustrative and non-limitative examples of such analysis include:

1. Images that were deleted—it is reasonably assumed that if an image has been deleted that means the user didn't like it.
2. Images that user have further used—if a user sends an image by MMS, or saves it to a PC or prints it, it is reasonable to assume that the user liked it.
3. The number of times that the user views the same image is also an indication of his liking.
4. Direct inputs can be obtained by the user by posing "Yes/No question" to him.

According to the invention, the learning process is an iterative process that starts using the parameters available in the camera, which in many cases will be the factory preset camera default parameters, and updates said parameters according to the behavior of the user. As will be apparent to the skilled person, adaptive processes that employ user's input are known in the art and set processes are therefore not described herein in detail, for the sake of brevity. Additional information is found, for instance, in "Image Sensors and Signal Processing for Digital Still Cameras" by J. Nakamura. Learning processes are also known, for instance as described in "Pattern Classification", by Duda, Hart, and Stork.

The invention is not meant to be limited to any particular learning process or method. Said learning process can be based, for example, on Neural Network/Markov Chain or other known AI (Antifriction intelligence) engine, like Adaptive Boosting algorithm, SVM (Support Vector Machine), decision trees and others.

In essence, operating according to the invention allows creating an automatic mode which is individually tailored for each user automatically. The same can be done for AW (Auto White balance) and AF (Auto Focus) For example if one user may prefer to have AF performing on people's faces like in portrait mode, and another user may prefer to have AF operating on background landscapes. Similarly, an automatic adaptation of AW can be provided, for example, to accommodate different users who like to capture Black-and-White, or Sepia, or Negative photos, taken under special conditions (like brightness level) or in special scenes (like portrait photos). Accordingly, personal preferences that can be manually adjust in some cameras, such as AW, AF, lens aperture, flash on/off, image size, timer, special effects (black-white), capture mode (normal, mosaic, multi-shot), are automatically tuned in the camera without the user's intervention. Some of the algorithms known in the art and used to make these adjustments use preview statistics (like histogram) to calculate AE (Auto Exposure)/AW/AF. Typically, the capturing process is also based on inputs from user (such as camera mode, Jpeg quality, image size, timer, etc). According to the invention the same preview statistics are used, but also additional inputs are exploited to learn the user's preferences, such as sharpness quality and GPS location. Thus, for example, during vocation a user may prefer to use lower quality files for photos, to save storage place on the disk. The camera can switch to low quality mode based on location. The learned information can be used, if desired, to carry out an automatic image classification process according to the user's preferences. For example, during a multi-sequence shooting images can be analyzed to locate the best photo, and unwanted photos (i.e., those that are blurred or very noisy) can be automatically deleted on the basis of already known user preferences.

During the learning process it is possible to weigh the contribution of each image parameters in many different ways, such as: the time passed from capturing, photos of the same place or sequence of photos, GPS location of the user, light conditions, etc. Additional information can also be acquired from post processing algorithms on images (like SNR (Signal to Noise Ratio) Sharpness quality, Composition (e.g., the number of people in the image).

Figure 2:
FIG. 2 shows pictures captured using long exposure times, which are noiseless but blurred.
Figure 2:

Looking now at FIG. 1, an example is seen, by comparing it with FIG. 2, of differences that will influence the decision of different users as to which image they prefer. While the first set is sharp and allows a greater identification of details, it contains a high level of noise which is aesthetically unpleasant. The second set, on the other hand, is more aesthetically pleasing, but because it has been captured using longer exposition exposure time it is more blurred and therefore does not allow for the identification of specific details.

Figure 3:
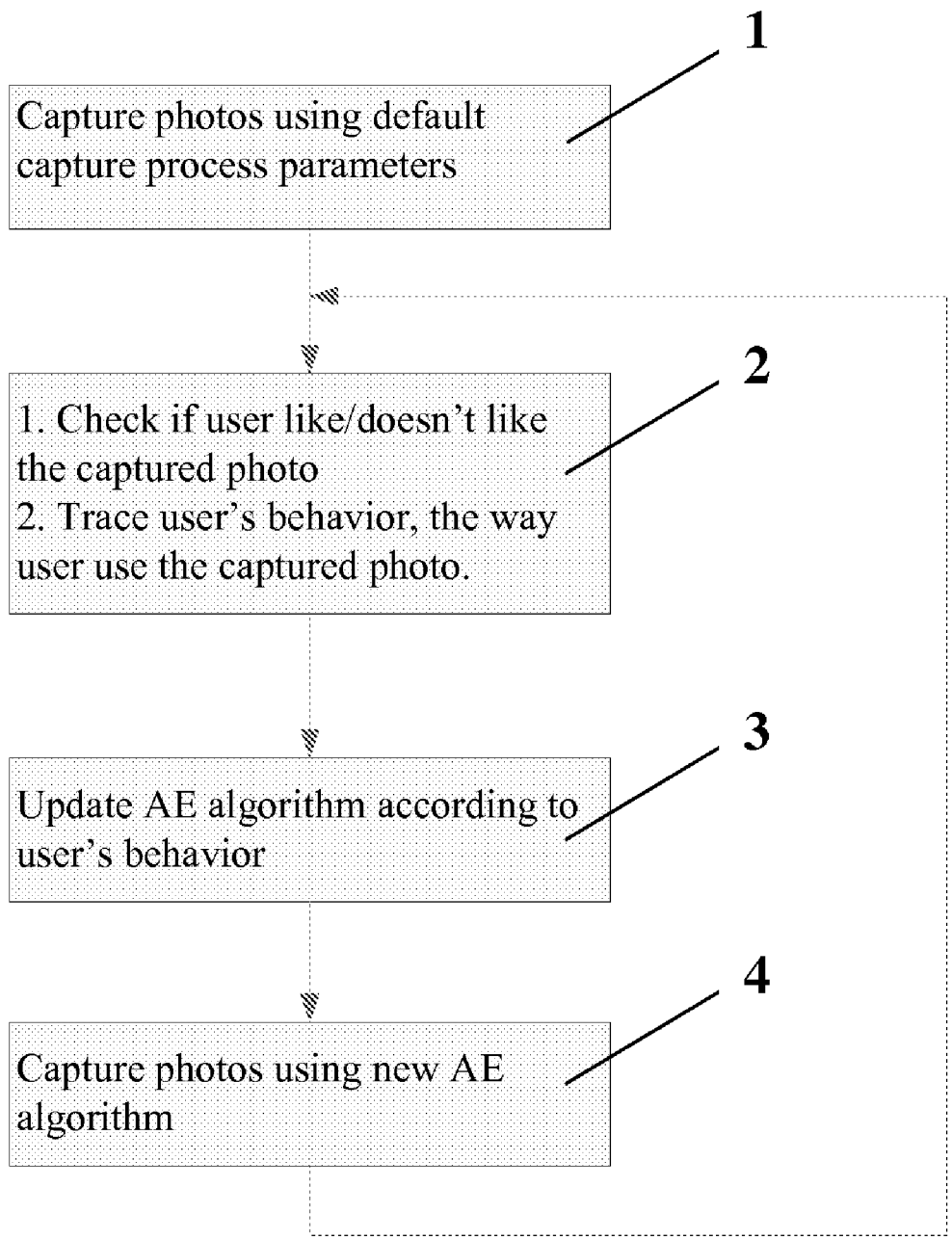
FIG. 3 is a block diagram of the process, according to a preferred embodiment of the invention.

FIG. 3 schematically illustrates the process according to a preferred embodiment of the invention. In step one the user starts to capture photos using whatever default parameters exist in his camera. In step 2, one or more behavioral analyses are carried out on the photograph, to determining whether the user likes the captured image or not, and to trace the user's behavior in respect of said image. In step 3 the shooting parameters are changed, so the AE algorithm is updated, according to said determined user's behavior. In step four the next photograph is captured using the updated AE algorithm, and then the process starting at step 2 is repeated. This process can continue indefinitely, since user's behavior may change due to a shift in preferences, and also the possession of the camera may change to a different user.

Figure 4:
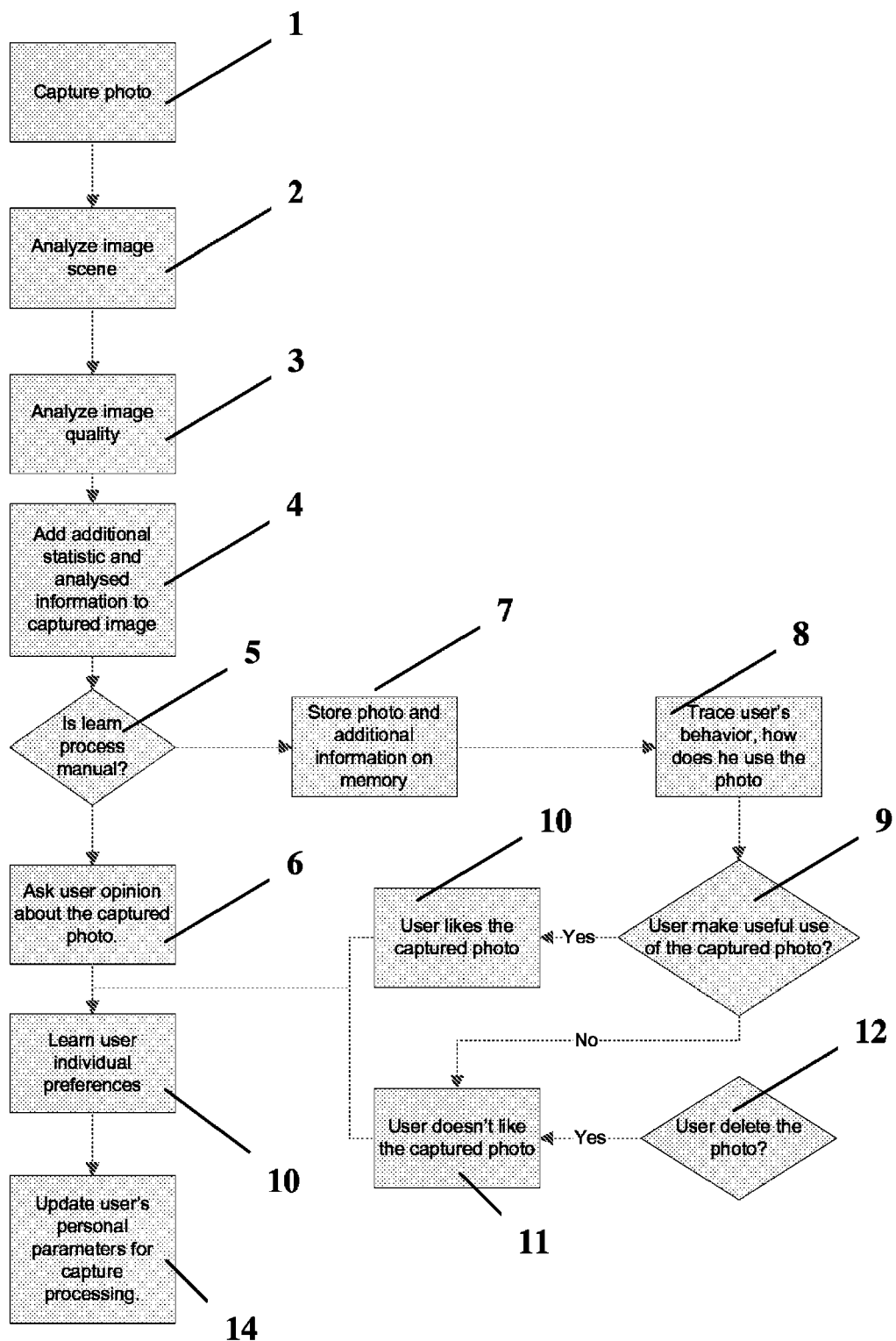
FIG. 4 is a block diagram of a process, according to another preferred embodiment of the invention.

FIG. 4 shows a more detailed block diagram of the process of steps 2 through 4 of FIG. 3, according to one particular illustrative embodiment of the invention. According to this particular example, the following steps are carried out. In step 1 an image is captured. In step 2 the image scene is analyzed, using standard image analysis methods and software, which is not described herein in detail for the sake of brevity, and which are well known to persons skilled in the art (for example face detection methods or other types of detection are performed on known patterns. In step 3 the quality of the image is analyzed, using any one of various possible sets of parameters that can be used to define image quality. For example, the edges sharpness can be calculated to check images sharpness/blurriness or according to the gain used the image histogram noise level can be analyzed). In step 4 additional statistical information and image-derived information is added as meta data to the captured image. For instance, information can be added to the jpeg file about relevant parameters like (sharpness, blurriness, noise level, GPS location and etc). This information can be used later for learning processes.

Stage 5 is a decision stage where the process must decide whether to proceed automatically, or to acquire input from the user manually (the user manually configures the system learning mode to decide whether it will be automatic or manual). If the decision is to proceed manually, one or more questions will be posed to the user in step 6, regarding his opinion of the quality of the picture. If, on the other hand, the decision is to proceed automatically, the image is stored, together with any additional information, in the camera memory in step 7. At this point, step 8, the user's behavior in regard to the specific image is traced with time, as explained above, to determine how he uses it.

Step 9 is another decision step in which the tracing done in step 8 permits to decide whether the user has made use of the captured image. If the image has been positively used, then a decision is made in step 10 that he likes the image. Otherwise, a decision is made in step 11 that the user does not like the captured photo. The same decision is reached in step 12, if that photo has been deleted.

Using the information obtained in the previous steps, step 13 draws conclusions on the individual preferences of the user. Such conclusions are used in step 14 to update the user's personal parameters to be used in the image capturing process from that point in time on, and until additional information is obtained, which changes said parameters. After step 14 has been completed, the process starts again at step 1.

As will be appreciated by the skilled person, several processes may proceed in parallel, if a plurality of images are captured during a short period of time. When this happens, steps 13 and 14 may combine information obtained from a number of images, or may be carried out sequentially for a sequence of captured images.

All the above description of preferred embodiments has been provided for the purpose of illustration and is not intended to limit the invention in any way. Many modifications can be carried out to the above, without exceeding the scope of the invention.

The invention claimed is:

1. An automatic method for optimizing a digital image acquired by a camera according to the preferences of the user, the method comprising:
   (a) providing, within the camera, a list which includes preferred camera parameters to apply during capturing of images;
   (b) defining "like" user actions and "dislike" user actions, each of said actions, when performed on an image file captured by the camera, indicates respectively that the user likes or dislikes the respective image;
   (c) upon each image capturing, storing within the respective image file those camera shooting parameters that have been used by the camera during said image capturing;
   (d) monitoring by the camera to detect "like" or "dislike" user actions with respect to each image file or image in their entirety, and upon detection of such an action, changing the preferred camera parameters within said list of preferred parameters based on the camera parameters stored within the respective image file; and
   (e) upon future capturing of images by the camera, adjusting one or more of the camera shooting parameters based on said list of preferred parameters;
   wherein each of said user "like" or "dislike" actions is an action which is either performed on the image file in its entirety independent of the image file specific content or any of the image details and thereby provides a "like" or "dislike" conclusion respectively in an indirect manner, or is alternatively at most a single incication from the user merely stating that the user either "likes" or "dislikes" the entire image which is the subject of said image file irrespective of any of the image details.

2. The method for optimizing a digital image according to claim 1, wherein said "like" actions are selected from the group consisting of:
   (a) an action showing that the user further uses the image file in its entirety;
   (b) an action of sending the image file by MMS;
   (c) an action of saving the image at a PC;
   (d) an action of printing the file;
   (e) viewing the image a number of times above a predefined threshold; and
   (f) at most one direct input from the user indicating that the user likes the image in its entirety.

3. The method for optimizing a digital image according to claim 1, wherein said "dislike" actions are selected from the group consisting of:
   (a) deleting of the image file; and
   (b) at most a single direst indication from the user stating that the user dislikes the image in its entirety.

4. The method according to claim 1, wherein said one or more shooting parameters are selected from flash on/off, image size, timer, special effects, capture mode, multi-shot, exposure time, AGC, digital gain, gamma, zoom, focus quality, image JPEG quality, and sharpness quality.

5. The method according to claim 1, wherein said list of preferred camera parameters is further used to carry out an automatic image classification in order to meet the user's preferences.

6. The method according to claim 5, which is performed during a multi-sequence shooting of images by said camera.

7. An automatic method for optimizing a digital image acquired by a camera according to the preferences of the user, the method comprising:
   (a) providing, within the camera, a list which includes preferred camera parameters to apply during capturing of images;
   (b) defining "like" user actions and "dislike" user actions, each of said actions, when performed on an image file captured by the camera, indicates respectively in an indirect manner that the user likes or dislikes the respective image;
   (c) upon each image capturing, storing within the respective image file those camera shooting parameters that have been used by the camera during said image capturing;
   (d) monitoring by the camera to detect "like" or "dislike" user actions with respect to each image file or image in their entirety, and upon detection of such an action, changing the preferred camera parameters within said list of preferred parameters based on the camera parameters stored within the respective image file; and
   (e) upon future capturing of images by the camera, adjusting one or more of the camera shooting parameters based on said list of preferred parameters;
   wherein each of said user "like" or "dislike" actions is an action which is performed on the image file in its entirety independent of the image file specific content or any of the image details and thereby provides a "like" or "dislike" conclusion respectively in an indirect manner.

8. The method for optimizing a digital image according to claim 7, wherein said "like" actions are selected from the groups consisting of:
   (a) an action showing that the user further uses the image file in its entirety;
   (b) an action of sending the image file by MMS;
   (c) an action of saving the image at a PC;
   (d) an action of printing the file;
   (e) viewing the image a number of times above a predefined threshold.

9. The method for optimizing a digital image according to claim 7, wherein one of said "dislike" actions is the deletion of the image file.

* * * * *